(12) United States Patent
Gaul et al.

(10) Patent No.: US 8,262,402 B2
(45) Date of Patent: Sep. 11, 2012

(54) CHARGING CABLE LOCKING DEVICE AND METHOD FOR LOCKING A CABLE

(75) Inventors: Armin Gaul, Selm (DE); Ingo Diefenbach, Unna (DE)

(73) Assignee: RWE AG, Essen (DE)

( * ) Notice: Subject to any disclaimer, the term of this patent is extended or adjusted under 35 U.S.C. 154(b) by 0 days.

(21) Appl. No.: 13/269,272

(22) Filed: Oct. 7, 2011

(65) Prior Publication Data

US 2012/0071017 A1  Mar. 22, 2012

Related U.S. Application Data

(63) Continuation of application No. PCT/EP2010/054596, filed on Apr. 7, 2010.

(30) Foreign Application Priority Data

Apr. 8, 2009 (DE) .......................... 10 2009 016 504

(51) Int. Cl.
*H01R 13/62* (2006.01)

(52) U.S. Cl. ......... 439/304; 439/133; 439/488; 320/109
(58) Field of Classification Search .................. 439/133, 439/304, 488; 320/108, 109, 111
See application file for complete search history.

(56) References Cited

U.S. PATENT DOCUMENTS

| | | | |
|---|---|---|---|
| 5,202,617 A | 4/1993 | Nor | |
| 5,710,502 A * | 1/1998 | Poumey | 320/108 |
| 2011/0300733 A1* | 12/2011 | Janarthanam et al. | 439/304 |
| 2012/0013301 A1* | 1/2012 | Gaul et al. | 320/109 |
| 2012/0071017 A1* | 3/2012 | Gaul et al. | 439/304 |
| 2012/0119702 A1* | 5/2012 | Gaul et al. | 320/109 |
| 2012/0126747 A1* | 5/2012 | Kiko et al. | 320/109 |
| 2012/0133326 A1* | 5/2012 | Ichikawa et al. | 320/109 |
| 2012/0135634 A1* | 5/2012 | Gaul et al. | 439/488 |

FOREIGN PATENT DOCUMENTS

| | | |
|---|---|---|
| DE | 196 42 687 A1 | 4/1998 |
| DE | 10 2007 002025 A1 | 7/2008 |
| GB | 2 438 979 A | 12/2007 |

* cited by examiner

*Primary Examiner* — James Harvey
(74) *Attorney, Agent, or Firm* — Reinhart Boerner Van Deuren P.C.

(57) ABSTRACT

Charging cable locking device for electric vehicles with a receptacle 2 on the vehicle side to receive a charging cable 4 that can be connected with a charging station 20, and a locking unit 8 arranged at the receptacle 2, wherein the locking unit 8 is arranged for locking and releasing the charging cable 4 with the receptacle 2. Secure charging is possible in that the locking unit 8 is coupled with a closing unit 32 of the vehicle such that on activation of the closing unit 32, the charging cable 4 can be locked with the receptacle 2, and that on deactivation of the closing unit 32, the charging cable 4 can be released from the receptacle 2.

8 Claims, 3 Drawing Sheets

CHARGING CABLE LOCKING DEVICE AND METHOD FOR LOCKING A CABLE

CROSS-REFERENCE TO RELATED PATENT APPLICATIONS

This patent application is a continuation of PCT/EP2010/054596, filed Apr. 7, 2010, which claims priority to German Application No. 10 2009 016 504.5, filed Apr. 8, 2009, the entire teachings and disclosure of which are incorporated herein by reference thereto.

FIELD OF THE INVENTION

The subject-matter relates to a charging cable locking device for electric vehicles with a receptacle on the vehicle side to receive a charging cable that can be connected with a charging station, and a locking unit arranged at the receptacle, wherein the locking unit is arranged for locking and releasing the charging cable with the receptacle.

BACKGROUND OF THE INVENTION

The distribution of electrically powered vehicles will increase rapidly in the near future. With the distribution of electric vehicles which are driven by an electric motor, it must however be ensured that these can be supplied with energy in the simplest manner. For this, a functioning infrastructure must be made available.

In particular, there must be a possibility of obtaining energy for electric vehicles in public areas. With the range of electric vehicles available up to now, of between 50 and a few 100 km, it is necessary for charging the vehicle to be possible outside the domestic environment. Therefore, charging stations must be made available in public areas in order to provide a constant availability of energy for electric vehicles through a power grid. This availability is a decisive criterion for the acceptance of electric vehicles.

If charging stations are installed in public areas, however, it must be ensured that "power theft" is avoided. In particular, unauthorised interruption of a charging process must be prevented. It must be also be ensured that the energy provided is also made available to the person paying for it.

For this reason, the subject-matter is based on the object of providing a device and a method which increases security when charging electric vehicles.

SUMMARY OF THE INVENTION

This object is achieved according to the subject matter by a charging cable locking device for electric vehicles in which the locking unit is coupled with a closing unit of the vehicle, such that on activation of the closing unit, the charging cable can be locked with the receptacle, and that on deactivation of the closing unit, the charging cable can be released from the receptacle.

A locking unit can be a mechanical locking of the charging cable to the receptacle. Here it is possible, for example, that the locking unit is connected with the charging cable by electromechanical means such that the charging cable is firmly held in the receptacle and cannot be removed from the receptacle. For example, pins or bolts could be moved into a socket or plug of the cable, wherein the pins or bolts are connected with the vehicle such that the charging cable can no longer be removed from the receptacle.

A closing unit can be a unit with which the locking unit can be activated. A closing unit can, for example, be a unit activated by a user with which the locking unit can be locked and opened. The closing unit can, for example, be a vehicle lock. The closing unit can for example be coupled with a central locking of the vehicle. The closing unit can also be formed by the central locking itself.

Activating the closing unit can, for example, be pressing a locking button. Also, the closing unit can be activated by locking the vehicle. It is also possible that activation of the closing unit consists of a transponder being removed from the vehicle such that the transponder signature can no longer be read.

Deactivating the closing unit can, for example, be understood in that a button or switch is activated again. Deactivation can, for example, also consist of a contactlessly readable transponder approaching the closing unit such that the transponder can be read. Deactivation can then be understood in that a transponder is moved within the range of the vehicle such that a signature can be read. Also deactivation can mean that a vehicle is opened.

On activation of the closing unit, the charging cable is locked in the receptacle by the locking unit according to the subject matter. The locking unit is thus moved into a closed state. This can be done electrically as well as mechanically. If the locking unit is in a closed state, the charging cable can no longer be removed mechanically from the receptacle.

On deactivation of the closing unit, the locking unit is moved into an open state. In this state the charging cable can be plugged into the receptacle and removed from the receptacle.

According to an advantageous embodiment, it is proposed that the closing unit is the central locking of the vehicle and that the locking unit is coupled with the central locking of the vehicle such that on closing of the vehicle using the central locking, the charging cable can be locked with the receptacle and that on opening the vehicle with the central locking, the charging cable is released from the receptacle.

It is found that the locking unit can be activated and deactivated by the central locking of the vehicle in a particularly simple and user friendly manner. The central locking is activated as normal by users of vehicles when the user moves away from the vehicle. The user locks his vehicle using the central locking. In this case it is to be assumed that the user of the vehicle is no longer monitoring the charging process. For this reason, on activation of the central locking and closing of the vehicle, it is to be assumed that the charging cable must be protected from unauthorised access. For this reason, on activation of the central locking according to the advantageous embodiment, the charging cable is locked to the receptacle. Unauthorised persons can no longer remove the charging cable from the receptacle after the vehicle has been locked.

When the user returns to his vehicle, he opens it as normal. The opening of the vehicle signals that the user wishes to continue his journey. In this case the user must be able to remove the charging cable from the receptacle. For this reason, according to the advantageous exemplary embodiment, it is proposed that on opening of the vehicle with the central locking, the charging cable can be released from the receptacle. The user can simply remove the charging cable from the receptacle without further problems.

According to an advantageous embodiment, it is proposed that the closing unit is a transponder read unit that can be activated wirelessly. For example, it is possible that a user carries a wireless readable transponder with him. This can for example be an RFID transponder. When the user moves away from his vehicle, the closing unit can no longer read the transponder. This can lead to activation of the closing unit. When the user approaches the vehicle again, the transponder read unit can read the transponder again and the closing unit can be deactivated. According to another example it is also possible that the transponder is used to connect the charging cable actively with the receptacle. For this, for example, the user can hold the transponder in the vicinity of the transponder read unit, whereupon the closing unit is activated. When the user holds the transponder in the vicinity of the transponder read unit again, deactivation can take place.

According to an advantageous exemplary embodiment it is proposed that a signalling unit is coupled with the locking unit, that the locking unit on activation of the closing unit transmits an activation signal to the signalling unit, and that subsequently the signalling unit transmits an enabling signal to the charging station to enable the charge current.

It has been found that the charge current should only flow when the charging cable is firmly anchored in the receptacle and can no longer be removed from the receptacle. For this reason a signalling unit is proposed. The signalling unit can be a unit which can transmit a coded or uncoded signal to the charging station via the charging cable or wirelessly or via a separate cable. In the charging station a receiver unit is provided which can receive and evaluate the signals from the signalling unit. When this receiver unit receives an enabling signal from the signalling unit, the receiver unit in the charging station can enable the charge current. This means that only after the locking unit has activated the closing unit an enabling signal is transmitted to the charging station, and only after the charging cable is secured in the receptacle the charge current is enabled. This prevents a charge current flowing although the charging cable is not secured in the receiver.

According to an advantageous embodiment, it is also proposed that a signalling unit is coupled with the locking unit, that the locking unit on activation of the closing unit transmits an activation signal to the signalling unit and that subsequently the signalling unit transmits to the charging station a locking signal to lock the charging cable to the charging station. As well as enabling of the charge current, the locking of the charging cable to the charging station is also important, as the charging cable else could be removed from the charging station and an unauthorised user could use the charging station to charge his own vehicle. For this reason, the charging cable must be locked in the charging station. The locking signal can for example be transmitted to the charging station together with the enabling signal. The locking signal and the enabling signal can also be identical. In addition, the locking signal can be signed and coded to ensure that the locking signal comes from an authorised signalling unit of a vehicle. If the receiver unit in the charging station receives the locking signal from the signalling unit, the receiver unit in the charging station causes a locking of the charging cable to the charging station. The locking mechanism can be mechanical and/or electrical.

When the user wishes to continue his car journey, he must remove the charging cable both from the vehicle and from the charging station. If the cable is removed from the vehicle, however, for safety reasons the charge current must also be deactivated. For this reason, according to an advantageous exemplary embodiment it is proposed that a signalling unit is coupled with the locking unit, that the locking unit on deactivation of the closing unit transmits a deactivation signal to the signalling unit and that the signalling unit subsequently transmits a disabling signal to the charging station to disable the charge current. Thus on deactivation of the closing unit i.e. release of the charging cable from the connection, a disabling signal is transmitted to the charging station. In the charging station a receiver unit can receive the disabling signal and activate a disabling of the charge current in the charging station. Disabling the charge current on release of the charging cable from the connection prevents the charging cable from generating an arc on separation from the connection. It is also prevented that the charging cable possibly causes a short circuit due to protruding contacts.

On deactivation of the closing unit, the charging cable can be removed from the connection. In order to be able to remove the charging cable from the charging station, the charging station has also to unlock the charging cable. For this reason, according to an advantageous embodiment, it is proposed that a signalling unit is coupled with the locking unit, that the locking unit on deactivation of the closing unit transmits a deactivation signal to the signalling unit and that the signalling unit then transmits an unlocking signal to the charging station to unlock the charging cable from the charging station. The unlocking signal can be transmitted immediately before or after the disabling signal. Also the unlocking signal can be identical to the disabling signal. The unlocking signal is received by a receiver unit in the charging station. After receiving the unlocking signal, the charging cable is unlocked in the charging station so that it can be removed from the charging station.

According to an advantageous embodiment, the receptacle is a plug or a socket. Accordingly the charging cable has a corresponding plug or socket.

A further subject-matter is a method for locking a charging cable to electric vehicles in which a charging cable is connected with a receptacle on the vehicle side, and the charging cable is released by means of a locking unit arranged on the vehicle side on the receptacle, with the receptacle locking. The method is characterised in that the locking unit is coupled with a closing unit of the vehicle such that on activation of the closing unit, the charging cable is locked with the receptacle and that on deactivation of the closing unit, the charging cable is released from the receptacle.

BRIEF DESCRIPTION OF THE DRAWINGS

The subject-matter is explained in more detail with reference to a drawing showing embodiments. In the drawing show.

DETAILED DESCRIPTION OF THE INVENTION

Figure 1A:
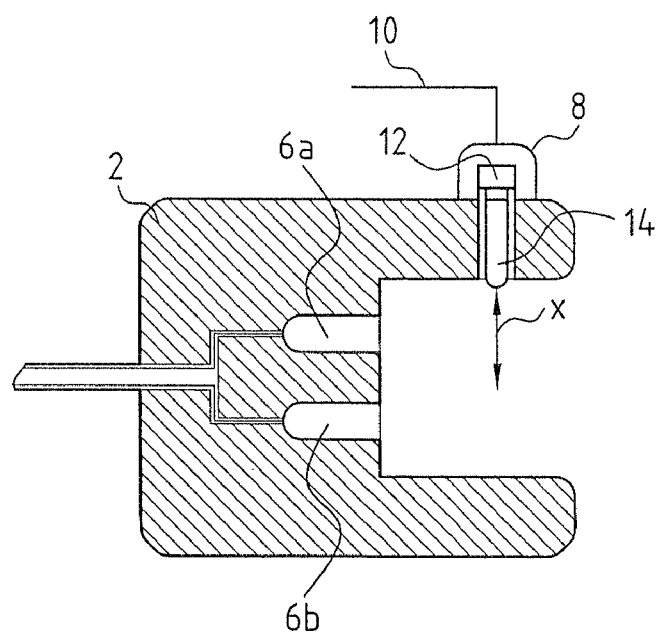
FIG. 1a is a schematic structure of a receptacle for a charging cable.

FIG. 1a shows schematic a receptacle 2 for a charging cable 4, not shown. A locking unit 8 is provided in the receptacle 2, which is formed as a socket with two contacts 6a, 6b. The locking unit 8 is connected via a data line 10 with a closing unit of the vehicle, for example a central locking. An electric drive 12 for a bolt 14 is provided in the locking unit 8. By means of the electric drive 12, the bolt 14 can be moved to and from in direction x. The electric drive 12 is operated to move the bolt 14 as a function of the signals of the data line 10.

Figure 1B:
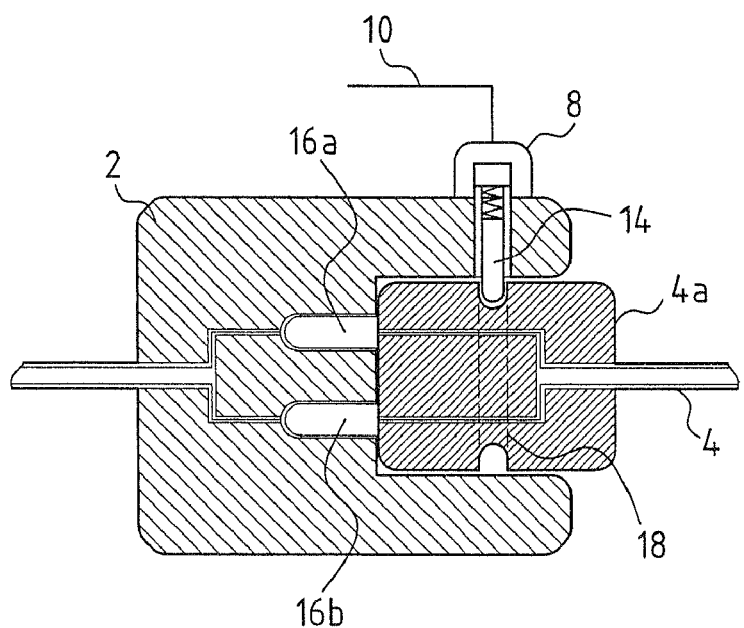
FIG. 1b is a schematic structure of a receptacle with a charging cable plugged in and locked.

The receptacle 2 is also shown in FIG. 1b. In FIG. 1b the charging cable 4 with plug 4a is plugged into the receptacle 2. As can be seen, the contacts 6 of the receiver 2 are electrically connected with corresponding contacts 16 of the plug 4a of the charging cable 4.

In the position shown in FIG. 1b, the locking unit 8 is activated by means of the data line 10 such that the electric drive 12 has moved the bolt 14 into a groove 18 of the parent plug 4a. By means of the bolt 14 which engages in the groove 18, the charging cable 4 is locked in the receptacle 2. By means of a further signal on the data line 10 the electric drive 12 of the locking device 8 is activated such that the bolt 14 can be moved out of the groove 18 so that the charging cable 4 is released.

Figure 2:
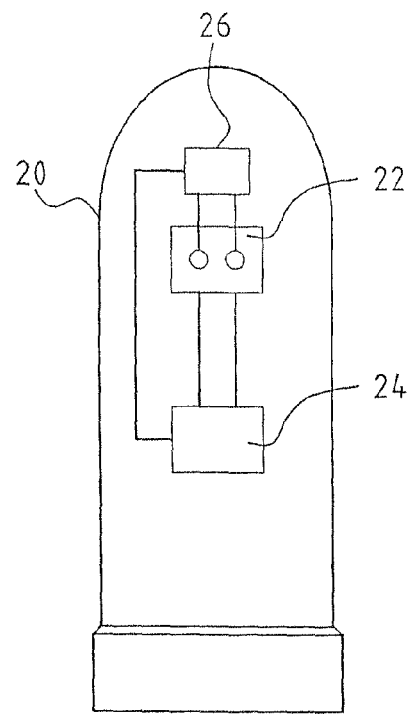
FIG. 2 is a schematic structure of a charging station.

FIG. 2 shows a charging station 20 with a receptacle 22 for a charging cable 4, not shown. The receptacle 22 can be formed according to the receptacle 2 and can also have a corresponding locking unit 8. In addition, the charging station 22 to charge the vehicle has charging means 24 which supply an electrical energy to the contacts of the receptacle 22, which energy can be drawn off by means of the charging cable. In addition, the charging station 20 has a receiver unit 26. By means of the receiver unit 26, signals present at the contacts of the receptacle 22 can be received. These signals can, for example, be an enabling signal, a locking signal, a disabling signal and an unlocking signal. The enabling signal and the unlocking signal can be identical. The disabling signal and the locking signal can also be identical. On receipt of the enabling signal by the receiver unit 26, the charging means 24 can be activated. On receipt of the locking signal, the receptacle 22 or the locking unit provided therein can be activated such that a connected charging cable is fixed into the receptacle 22.

On receipt of a disabling signal by the receiver unit 26, the charging means 24 can be deactivated such that the current in connection in receptacle 22 is switched off. On receipt of an unlocking signal by the receiver unit 26, if can control the locking device of the receptacle 22 such that a connected charging cable is released.

Figure 3:
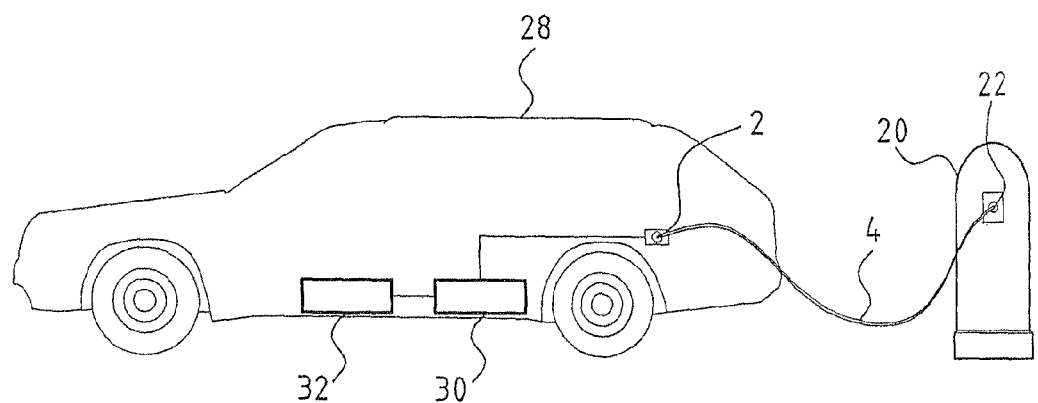
FIG. 3 is a schematic structure of a charging system with a vehicle and a charging pillar.

FIG. 3 shows a vehicle 28 with a receptacle 2 for a charging cable 4 and a charging station 20 with a receptacle 22. The vehicle 28 in addition has a signalling unit 30 and a closing unit 32. The signalling unit 30 can be coupled with the closing unit 32. The signalling unit 30 can transmit information via a data line to the contacts 6 of the receptacle 2. Also the signalling unit 30 can be coupled via a data line 10 with the locking unit 8.

Figure 4:
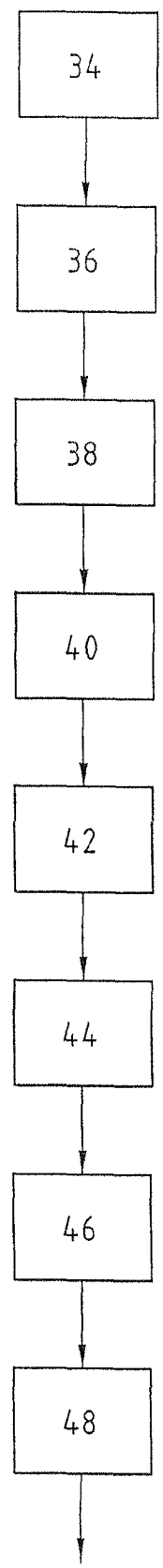
FIG. 4 is a flow chart of an example method.

The closing unit 32 can be the central locking of the vehicle 28. The closing unit 32 can, for example, also be a transponder read device. In the case shown in FIG. 3, the charging cable 4 is plugged into the receptacle 2 and the receptacle 22. The sequence of the method according to the subject matter is then shown diagrammatically in connection with FIG. 4.

In a first step 34, the driver of the vehicle 28 can transmit, for example by means of his key, a closing signal to the closing unit 32. By means of the closing signal, the doors of the vehicle 28 are closed. In parallel, the closing unit 32 transmits an activation signal to the signalling device 30.

The signalling unit 30 uses this activation signal firstly to control the locking unit 8 in a step 36. In step 36, the locking unit 8 locks the charging cable 4 in the receptacle 2 by means of the bolt 14. In addition, the signalling unit 30, in a step 38, transmits a locking signal via the charging cable 4 to the charging station 20. In the charging station 20, the locking signal is received by the receiver unit 26 and the receiver unit 26 causes the charging cable 4 to be locked in the receptacle 22 of the charging station 20.

Thereupon, in a step 40, the signalling unit 30 transmits an enabling signal via charging cable 4 to the charging station 20. The enabling signal is received in the charging station 20 by means of the receiver unit 26. The receiver unit 26 activates the charging means 24, whereupon a charge current is enabled. Via the charging cable 4, a charging current thus flows to the vehicle 28 to charge a battery of the vehicle 28.

When the driver of vehicle 28 returns to his vehicle, he can open his vehicle again by means of a key; the closing unit 32 receives the corresponding deactivation signal in a step 42 and opens the doors of the vehicle 28. In a step 44, the signalling unit 30 thereupon transmits a disabling signal via the charging cable 4 to the charging station 20. In the charging station 20, the receiver unit 26 receives the disabling signal and carries out a deactivation of the charging means 24.

The signalling unit 30 then transmits an unlocking signal to the charging station 20 via the charging cable 4 in a step 46. The receiver unit 26 receives the unlocking signal and carries out an unlocking of the charging cable 4 from the receiver 22.

Eventually, in a step 48, the locking unit 8 is controlled such that the charging cable 4 is unlocked from the receptacle 2. For this, the bolt 14 is moved out of the groove 18 by means of the electric drive 12.

Then the user can simply remove the charging cable 4 from receptacles 2 and 22 and the charging process is completed.

By means of the method described, it is possible to provide secure charging even in the absence of the user of a vehicle.

The invention claimed is:

1. Charging cable locking device for electric vehicles with
  a receptacle on the vehicle side to receive a charging cable that can be connected with a charging station, and
  a locking unit arranged at the receptacle,
  wherein the locking unit is arranged for locking and releasing the charging cable with the receptacle,
  wherein
    the locking unit is coupled with a closing unit of the vehicle such that on activation of the closing unit, the charging cable can be locked with the receptacle, and that on deactivation of the closing unit, the charging cable can be released from the receptacle, and
    a signalling unit is coupled with the locking unit, in that the locking unit on activation of the closing unit transmits an activation signal to the signalling unit and in that subsequently the signalling unit transmits a locking signal to the charging station to lock the charging cable to the charging station.

2. Charging cable locking device of claim 1, wherein the closing unit is a central locking of the vehicle and in that the locking unit is coupled with the central locking of the vehicle such that on closing of the vehicle using the central locking, the charging cable can be locked with the receptacle, and that on opening of the vehicle with the central locking, the charging cable can be released from the receptacle.

3. Charging cable locking device of claim 1, wherein the closing unit is a transponder read device that can be activated wirelessly.

4. Charging cable locking device of claim 1, wherein a signalling unit is coupled with the locking unit, in that the locking unit on activation of the closing unit transmits an activation signal to the signalling unit and in that subsequently the signalling unit transmits an enabling signal to the charging station to enable the charge current.

5. Charging cable locking device of claim 1, wherein a signalling unit is coupled with the locking unit, in that the locking unit on deactivation of the closing unit 30 transmits a deactivation signal to the signalling unit and in that subsequently the signalling unit transmits a disabling signal to the charging station to disable the charge current.

6. Charging cable locking device of claim 1, wherein a signalling unit is coupled with the locking unit, in that the locking unit on deactivation of the closing unit transmits a deactivation signal to the signalling unit and in that subsequently signalling unit transmits an unlocking signal to the charging station to unlock the charging cable from the charging station.

7. Charging cable locking device of claim 1, wherein the receptacle is a plug or a socket.

8. Method for locking a charging cable to electric vehicles in which
- a charging cable is connected with a receptacle on the vehicle side, and
- the charging cable is locked and released with the receptacle by means of a locking unit arranged at the vehicle side on the receiver, wherein
- the locking unit is coupled with a closing unit of the vehicle such that on activation of the closing unit, the charging cable is locked with the receptacle, and that on deactivation of the closing unit, the charging cable is released from the receptacle, and
- a signally unit is coupled with the locking unit, such that on activation of the closing unit an activation signal is transmitted from the closing unit to the signally unit and subsequently a locking signal is transmitted from the signalling unit to the charging station to lock the charging cable to the charging station.

* * * * *